United States Patent
Abdossalami et al.

(10) Patent No.: US 9,275,642 B2
(45) Date of Patent: Mar. 1, 2016

(54) VOICE-OPERATED INTERNET-READY UBIQUITOUS COMPUTING DEVICE AND METHOD THEREOF

(71) Applicant: Unified Computer Intelligence Corporation, Toronto (CA)

(72) Inventors: Amin Abdossalami, York (CA); Leor Grebler, Richmond Hill (CA); Mahyar Fotoohi Ghiam, Toronto (CA)

(73) Assignee: Unified Computer Intelligence Corporation, Toronto, Ontario (CA)

( * ) Notice: Subject to any disclaimer, the term of this patent is extended or adjusted under 35 U.S.C. 154(b) by 302 days.

(21) Appl. No.: 13/836,271

(22) Filed: Mar. 15, 2013

(65) Prior Publication Data

US 2014/0136195 A1  May 15, 2014

Related U.S. Application Data

(60) Provisional application No. 61/725,630, filed on Nov. 13, 2012.

(51) Int. Cl.
 *H04M 3/22* (2006.01)
 *H04M 3/58* (2006.01)
 *G10L 15/26* (2006.01)

(52) U.S. Cl.
 CPC ............. *G10L 15/26* (2013.01); *H04M 3/2236* (2013.01); *H04M 3/58* (2013.01)

(58) Field of Classification Search
 CPC ... H04M 3/22; H04M 3/2227; H04M 3/2236; H04M 3/58; G10L 15/22
 See application file for complete search history.

(56) References Cited

U.S. PATENT DOCUMENTS

| | | | |
|---|---|---|---|
| 5,657,425 A | 8/1997 | Johnson | |
| 6,654,720 B1 | 11/2003 | Graham et al. | |
| 8,055,201 B1 * | 11/2011 | Kuan | 455/67.11 |
| 8,140,003 B2 | 3/2012 | Laroia et al. | |
| 8,219,655 B2 | 7/2012 | Yano et al. | |
| 8,379,830 B1 * | 2/2013 | Naik et al. | 379/265.02 |
| 2002/0168983 A1 * | 11/2002 | Kumaran et al. | 455/446 |
| 2004/0260438 A1 * | 12/2004 | Chernetsky et al. | 701/36 |
| 2005/0201530 A1 * | 9/2005 | Koch et al. | 379/88.04 |
| 2006/0168095 A1 * | 7/2006 | Sharma et al. | 709/217 |
| 2006/0171368 A1 * | 8/2006 | Moinzadeh et al. | 370/346 |
| 2007/0005369 A1 * | 1/2007 | Potter | 704/275 |
| 2007/0019618 A1 * | 1/2007 | Shaffer et al. | 370/352 |
| 2007/0064913 A1 * | 3/2007 | Shaffer et al. | 379/265.02 |
| 2007/0286160 A1 * | 12/2007 | Gorti et al. | 370/352 |

(Continued)

OTHER PUBLICATIONS

International Search Report dated Jan. 23, 2014 for Application No. PCT/CA2013/050859.

*Primary Examiner* — Eric Yen
(74) *Attorney, Agent, or Firm* — Marshall & Melhorn, LLC

(57) ABSTRACT

In one aspect of this disclosure, a voice-operated internet-ready ubiquitous computing device and a method implemented by the computing device are disclosed. A sound input associated with a user is received at the first computing device, and in response to receiving the sound input, the first computing device establishes a voice session associated with the user. The first computing device then determines a session quality associated with the voice input, and sends the session quality to a further computing device such as a second computing device or a server. The first computing device will receive a request to transfer the voice session to a second computing device; and in response to receiving the request, transfers the voice session to the second computing device.

13 Claims, 7 Drawing Sheets

(56) References Cited

U.S. PATENT DOCUMENTS

| | | |
|---|---|---|
| 2008/0120094 A1 | 5/2008 | Mate et al. |
| 2008/0147406 A1* | 6/2008 | Da Palma et al. ............. 704/260 |
| 2009/0201824 A1* | 8/2009 | Leung et al. ................. 370/252 |
| 2010/0009674 A1* | 1/2010 | Sapkota et al. ............ 455/426.1 |
| 2011/0202594 A1 | 8/2011 | Ricci |
| 2012/0102131 A1 | 4/2012 | Lin et al. |
| 2012/0225652 A1 | 9/2012 | Martinez et al. |
| 2012/0281579 A1 | 11/2012 | Noldus |
| 2013/0064106 A1* | 3/2013 | Sylvain ........................ 370/252 |
| 2013/0143534 A1* | 6/2013 | Ferringo et al. ........... 455/414.1 |

* cited by examiner

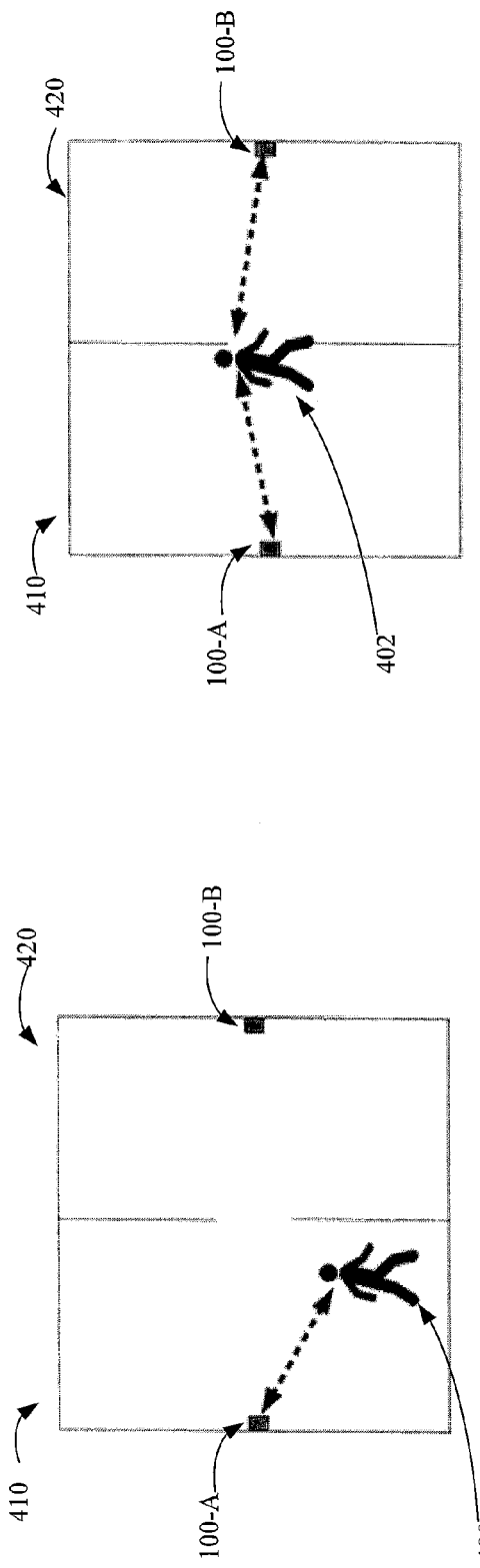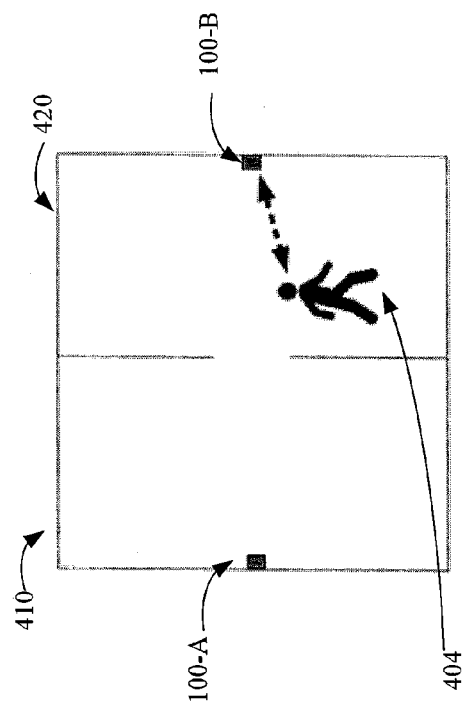
FIG 6A
FIG 6B
FIG 6C

VOICE-OPERATED INTERNET-READY UBIQUITOUS COMPUTING DEVICE AND METHOD THEREOF

This Application claims the benefit of and priority to U.S. patent application Ser. No. 61/725,630 dated Nov. 13, 2012, the contents of which are incorporated herein by reference.

BACKGROUND

This document relates to a voice-operated computers and methods for transferring sessions between such computers.

Voice-enabled software to aid in accessing information on the Internet or for performing tasks has been employed on computing devices. Conventionally, activating this software for use requires the employment of physical inputs, such as using hands with a computer mouse or fingers to press keys or touch a screen. Also, this software and related devices is typically configured for use by a single user on a single device.

For a home or office setting, the user may have their extremities occupied and may not be able to activate the software through physical input. Additionally, personal or mobile computing devices may be located in a separate room or may be occupied with other tasks. The dexterity level required to manipulate some computing devices might also prevent people with little or no motor capability from unassisted use of those devices.

Voice-enabled software and devices are typically employed by the individual user. These are carried by the user and travel with the user. In a home environment, these devices are typically set aside in a fixed location and are no longer easily accessible to the user.

There is a need for a dedicated voice-operated, always-on and always ready device that can allow the user from a distance to look up information on the Internet or send commands to Internet-based and/or local machine services that are initiated through voice and for this information to be acknowledged back to the user either through spoken word or through other mechanisms for acknowledging the receipt of a command.

There is also a need for methods to monitor and enable such a device so that it can be operated only through voice without the requirement of any physical input. There is also a need for multiple such devices to be able to function collectively.

BRIEF SUMMARY

According to example embodiments there is provided a voice-operated Internet-ready ubiquitous computing device. The device may include, for example, outputs such as audio speakers, multi-colored light-emitting diodes (LEDs), and an audio-out jack. The device includes a plurality of inputs such as a stereo microphone, temperature sensor, air pressure sensor, ambient light sensor, and a humidity sensor. In example embodiments, the device includes one or more data I/O interfaces such as a Universal Serial Bus (USB) port (for transferring data to and from the device invention. Through wireless communication such as WiFi, the device can access the Internet. Through radio frequency (RF) communication, it can communicate with RF-enabled devices. Through onboard software, the device is enabled to continuously monitor for and recognize a trigger word and capture additional voice information. Voice data is transmitted to an Internet-based voice and/or local service that converts it from speech to text (SU). This text string is received by software on the device, which then determines an appropriate operation. In example embodiments, a button on the device allows for the device to be completely turned off or for the microphones and speakers to be disabled.

In one aspect of this disclosure, a voice-operated internet-ready ubiquitous computing device and a method implemented by the computing device are disclosed. A sound input associated with a user is received at the first computing device, and in response to receiving the sound input, the first computing device establishes a voice session associated with the user. The first computing device then determines a session quality associated with the voice input, and sends the session quality to a further computing device such as a second computing device or a server. The first computing device will receive a request to transfer the voice session to a second computing device; and in response to receiving the request, transfers the voice session to the second computing device.

BRIEF DESCRIPTION OF DRAWINGS

Example embodiments are described below with reference to the following drawings.

FIG. 6A-6C are schematic images illustrating a method of transferring a voice session between a plurality of the computing devices of FIG. 1 as a user moves.

DETAILED DESCRIPTION

Figure 1A:
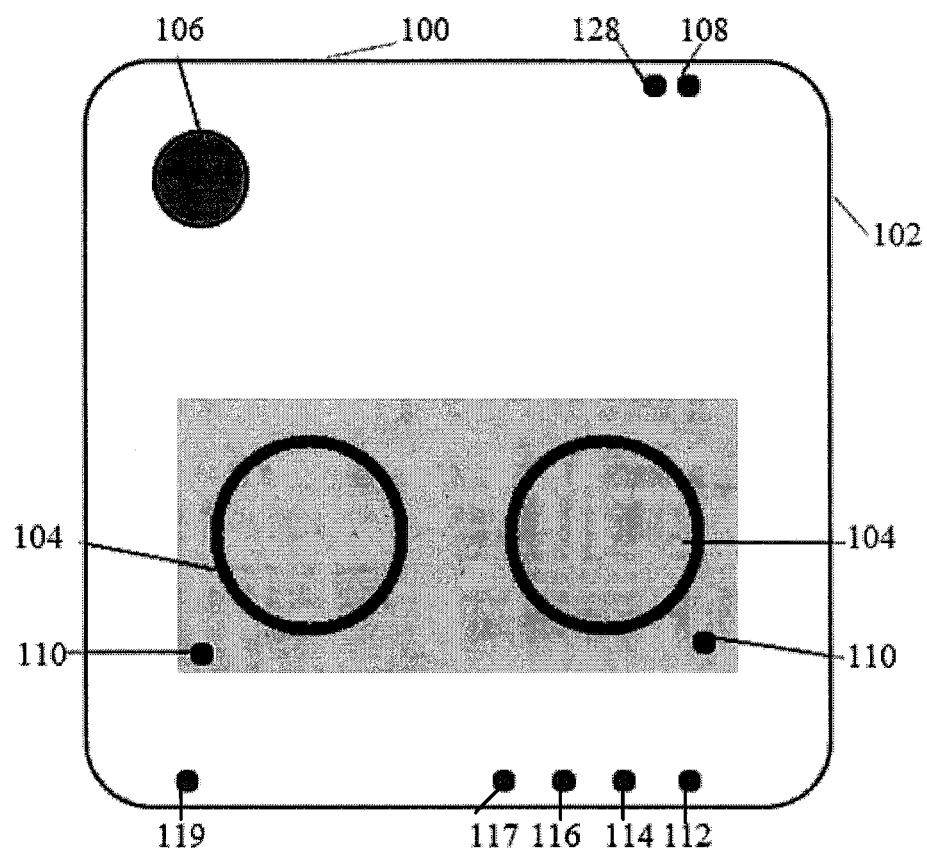
FIGS. 1A and 1B are front and side views of a voice-operated computing device according to an example embodiment
Figure 1B:
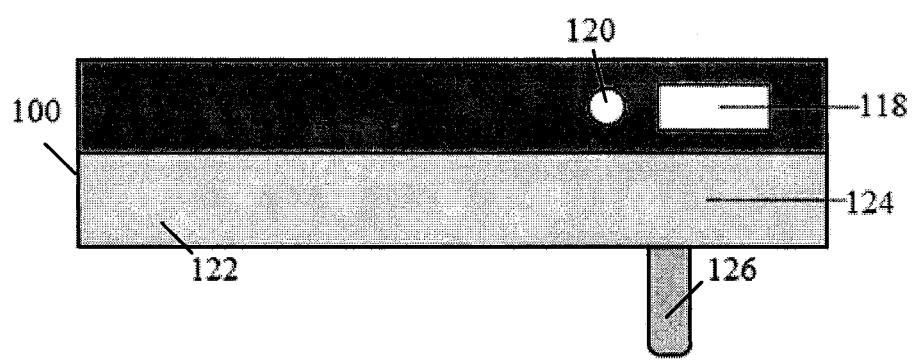
Figure 3:
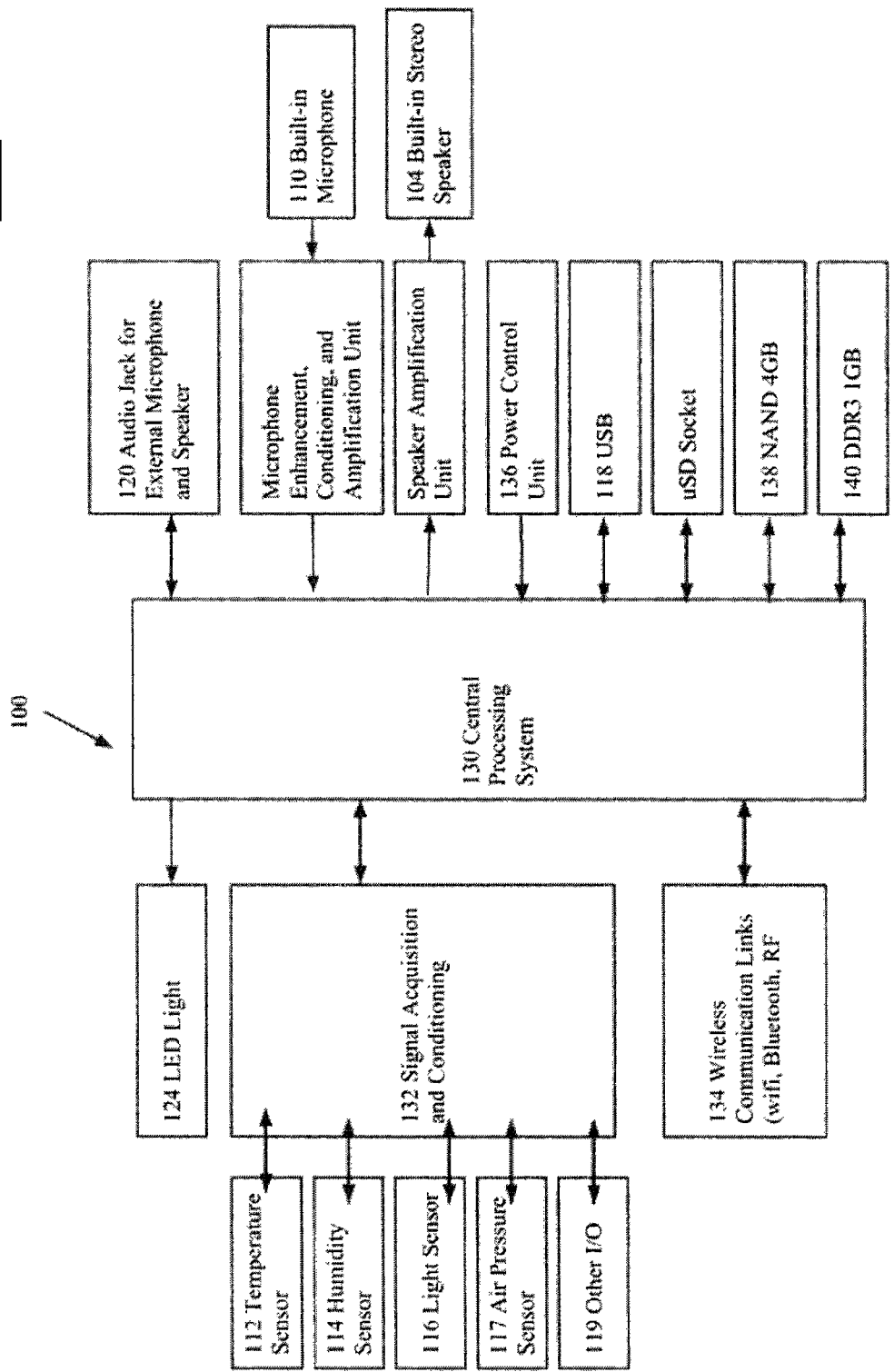
FIG. 3 is a block diagram illustrating electronic components that implement the computing device of FIG. 1 and modules of FIG. 2 according example embodiments.

FIGS. 1A and 1B are exemplary schematic external views of the front and side of an electronic computing device 100 and FIG. 3 is a block diagram of the electronic components of computing device 100, according to an example embodiment. The computing device 100 includes a casing 102 that houses the components shown in FIG. 3, including a button 106, stereo speakers 104, stereo microphones 110 (or other microphone array), temperature sensor 112, humidity sensor 114, light sensor 116, air pressure sensor 117, other sensors 119 such as an ambient light sensor 108, a data port such as a USB port 118, an audio input/output port 120 for connecting to external microphone/speakers, and LED lights 124. These components are each connected directly or indirectly to a central processing system 130 that controls overall operation and functioning of the computing device 100 under the control of program instructions and configuration data that are stored on one or both of persistent and transient storage 138, 140. The computing device 100 includes a wireless communication system 134 operatively connected to the central processing system 130. The wireless communications system 134 includes an antenna 128 and one or more of a WiFi module (wireless LAN or WLAN), a wide area network radio frequency (RF) module, and a BlueTooth™ module. In an example embodiment, the communications system 124 includes an interface for communicating over power lines within a building. In an example embodiment, LEDs 124 are visible through a translucent panel 122 of the computing device 100. Power for the computing device 100 is provided through a power control unit 136 which may be connected to an on-board DC battery source or an external AC power source. In one example, an AC plug 126 (see FIG. 1B) extends from power control unit 136 and the back of device casing 102 such that the device 100 can be plugged into and physically supported by an electrical AC power outlet.

The button 106 allows for physical input to the device 100 and in some embodiments may be the only physical user input present on the device. It can be a touch sensitive or an electromechanical switch. In some example implantations, it exhibits different functionalities based on the duration it is pressed or the number of times it is pressed, or a combination thereof. The functionalities include but are not limited to mute, standby, on/off, and reset operations.

In an example embodiment, the communications system 134 (including antennae 128, WiFi, RF and Bluetooth modules) is capable of receiving and transmitting data to the Internet, other voice-operated Internet-ready ubiquitous computing devices 100, and to and from home automation devices that use RF frequency for communications.

Figure 2:
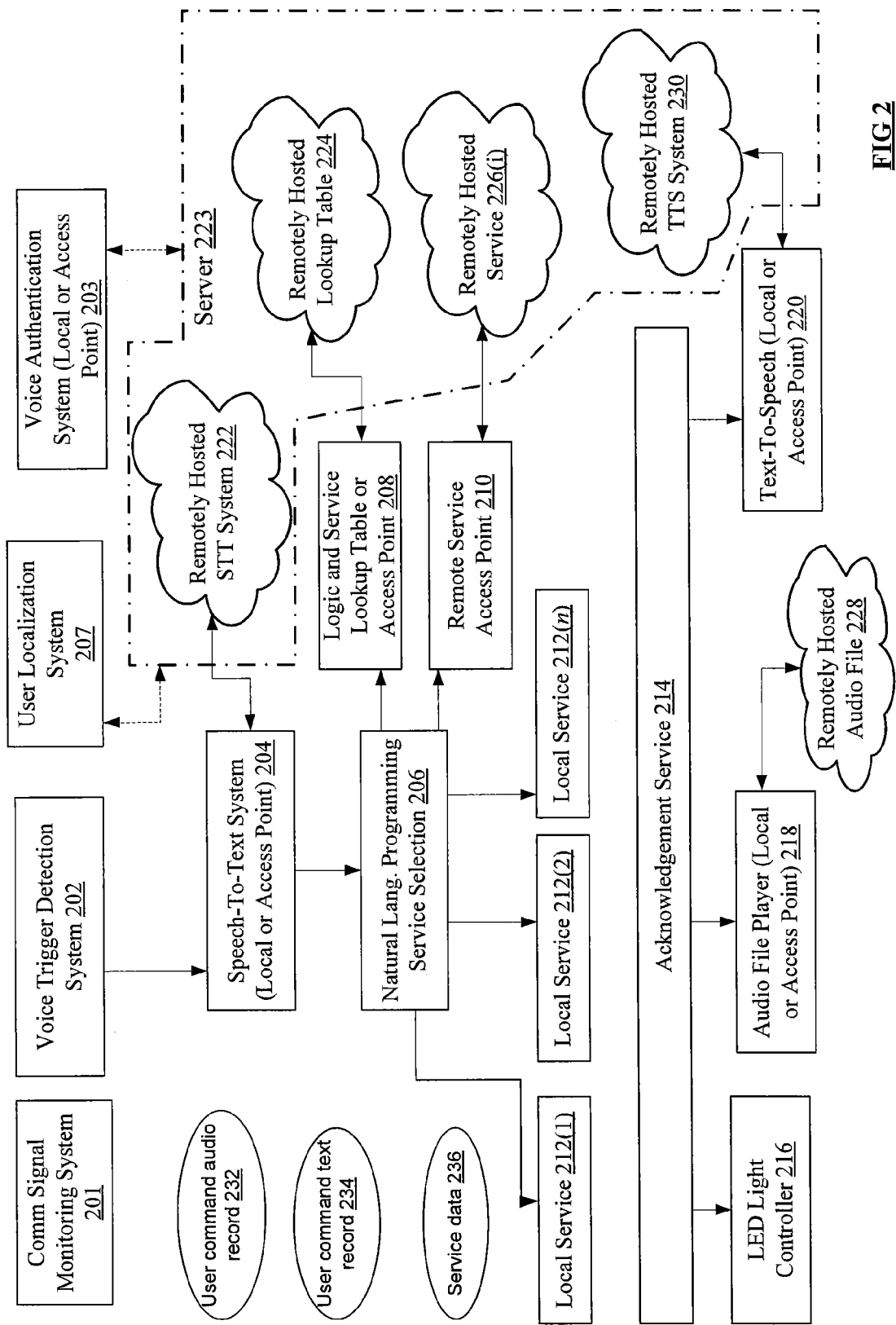
FIG. 2 is a schematic diagram illustrating modules implemented on the computing device of FIG. 1 according to example embodiments.

Referring to FIG. 2, in example embodiments the components of the computing device 100 described above are configured by software and or firmware resident on the device to implement an always-on, voice-operated, Internet enabled computer having various modules 200, including for example a communications monitoring system 201, voice trigger detection system 202, voice authentication system 203, speech-to-text system 204, natural language service selection program 206, user localization system 207, logic and service lookup table or access point 208, local services 212(i) (where 1<=i<=n), remote service access point 210, acknowledgement service 214, LED light controller 216, audio file player 218 and text to speech system 220. In at least some example embodiments, local services 212(i) comprise an interface for communication over a local communications link such as a wireless LAN or Bluetooth™ with a local appliance that is located in the proximity of the computing device 100.

In an example embodiment, voice input to the computing device 100 is captured by a microphone array that includes at least two or more spaced apart microphones 110. Processing system 130 is configured to continuously estimate the distance of a user from the device 100 and adaptively adjust the gains of the microphones 110 to provide sound quality suitable for speech-to-text conversion. In at least some example embodiments the computing device 100 operates in a default monitoring mode in which it monitors for the occurrence of one or more input conditions that will prompt the device 100 to perform one or more actions. Accordingly, in example embodiments the computing device 100 continuously monitors microphones 110 for audio inputs within a listening proximity of the device 100, monitors its environmental sensors 112, 114, 116 and 117 to detect environmental conditions in the proximity of the device 100, and monitors signals received through wireless communication system 128. Based on monitored audio inputs or environmental conditions or communications signals, a trigger condition may be detected and the computing device 100 initiates one or more local services 212(i) or remotely hosted services, as will be discussed in greater detail below.

With reference to FIG. 2, in an example embodiment, once the device 100 is turned on, the voice trigger detection system 202 continuously monitors for an audio input through microphone 110. When an audio input is detected, it is compared against a predefined set of trigger words or phrases stored on the device 100 to determine if there is a match. In some example embodiments, the audio input/pre-defined trigger word comparison can take the form of comparing the audio signal waveform received through microphone 110 against waveform information that is pre-stored on the device for each of the predetermined trigger words or phrases. In one example embodiment, the trigger phrase could include only a single word or small number of words or word variations for example "COMPUTER" or "COMPUTER LISTEN", and the device could be pre-configured to include waveform samples of the trigger word from a number of possible users of the device 100 (for example, a set of family members) that would allow the device 100 to efficiently and continuously monitor its aural environment for audio signals that correspond to the trigger word or phrase.

The voice trigger detection system 202 may be programmed to detect the keywords that are only uttered by the voice of legitimate users of the device by use of a voice authentication system 203. Therefore, the voice trigger detection system 202 may consist of two stages, keyword recognition and voice identity recognition. The computing device 100 may also be programmed to switch between settings depending on which user is uttering the trigger word and command, thus enabling different authorized users to have different levels of access to services 212(i) and 226.

In one example embodiment, voice authentication system 203 does not perform the conversion locally, but sends the user command audio record 232 via wireless communications system 134 through a communications network (for example a wireless LAN connected to the Internet) to a remotely hosted voice authentication system where the audio record is compared to an existing voice pattern, voice print or voice model stored in memory associated with the voice authentication system. If the audio record 232 matches a stored voice model the remotely hosted voice authentication system will associate a user ID with the voice pattern. In some examples, the userID associated with the matched voice pattern is sent back to the device 100. The voice authentication system could for example be implemented on a web-based server 223. In some example embodiments, voice authentication may alternatively be performed locally at the computing device 100 provided the device has sufficient processing power to perform the authentication.

Once the trigger phrase is detected, (and the user authenticated if necessary), a session between the user and the computing device 100 is established. The remainder of the spoken utterance by the user (i.e. the user command) during the voice session is automatically recorded as an audio record 232 by speech-to-text system 204 to enable speech-to-text conversion. In one example embodiment, the speech-to-text system 204 does not perform the conversion locally, but sends the audio record 232 via the wireless communications system 134 through a communications network (for example a wireless LAN connected to the Internet) to a remotely hosted speech-to-text system 222 where the audio record is converted to a corresponding text record 234 that is then sent back to the computing device 100. In some example embodiments, speech-to-text conversion may alternatively be performed locally at the computing device 100 provided the device has sufficient processing power to perform the conversion. In some example embodiments a local/remote hybrid conversion may occur with some parts of an audio record 232 converted locally at device 204 while other parts are sent to remotely hosted speech-to text system 222 for conversion.

Once a text record 234 conversion of the user command audio record 232 is available it is processed by natural language programming service selection 206 to select and initiate one or more local services 212(i) or remote services 226 as required to satisfy the user command. In at least some example embodiments, the natural language programming service selection program 206 references a logic and service lookup table module 208 that includes either a locally stored lookup table or functions as an access point to a remotely hosted lookup table 224. In the case where lookup table module 208 does not perform the user command text record 234 processing locally, all or selected parts of the text record 234 is sent via wireless communications system 134 through a communications network (for example a wireless LAN connected to the Internet) to remotely hosted lookup table 224 where the text record 234 is converted to suitable set of commands and data (collectively service data 236) for use by the appropriate service 212(i) or 226 and the service data 236 is then sent back to the computing device 100. In some example embodiments a local/remote hybrid conversion of the user command text record 234 to service data 236 may occur with some parts processed locally at device 200 while other parts are sent to the remotely hosted lookup table 224 for processing.

Once the user command text record 234 is processed to provide service data 236, the natural programming service selection program 206 determines which local service or remote services should be initiated and then provides the service data 236 to the appropriate service 212(i) or 226. In the case of a remotely hosted service 226, the service data is provided through remote service access point 210. For example, all or selected parts of the service data 236 is sent via wireless communications system 134 through a communications network (for example a wireless LAN connected to the Internet) to remotely hosted service 226.

In at least some example embodiments the local service 212(i) or the remotely hosted service 226 provide one or both of data and instructions to an acknowledgement service module 214 of the device 100 which in turn calls on functions such as LED light controller 216, audio file player 218 or text to speech system 220 to provide output to a user.

In example embodiments the device 100 employs software to override faults and errors that may occur in applications (including but not limited to the modules shown in FIG. 2) running on the device in order to maintain high availability of voice operation. Referring to FIG. 2, the device will employ this logic in the Voice Trigger Detection System 202, the Natural Language Programming Service Selection Program 206, and the Acknowledgement Service 214. The software will reset the device 100 to an initial state of operation should a fault or error be detected while an application is running on the device with one such error being a set period of time of inactivity within an application.

As noted above, in some embodiments the computing device is configured to monitor for input conditions in the form of communications signals that will trigger the device to take action. In this regard, in some embodiments the central processing system is configured to implement a communications signal monitoring system 201 that monitors for predefined communications signals received at the computing device 100 via wireless communications system 134 through a communications network (for example a wireless LAN connected to the Internet). The communications signals could for example be sent to the device 200 from a further computing device that may, for example, be another computing device 100 that makes up a distributed system or may be a remote web-based server such as server 223.

In some examples, the device processor 130 is configured to implement a user localization system 207 to determine proximity of a user to the device 100. The user localization system 207 may for example encompass a user identification system and a user tracking system, thereby allowing the computing device 100 to track the positions of one or more users and to store the position information associated with the users. The localization system 207 may be implemented by a variety of techniques, including using detected sound inputs at microphone array 110. Using real-time digital signal processing techniques, such as beam forming, the location and strength of a detected sound input can be determined. The voice authentication system 203 may be used in conjunction with localization system 207 to identify the user when the sound input is a speech sound input.

In some embodiments, wireless radio signals received by the communications monitoring system 201 are used by the user localization system 207 to determine the position of an authorized user. The user may carry a portable wireless device having a wireless transceiver, such as a smartphone, a watch, an RFID, a token, or other portable wireless device that is paired and authenticated with the computing device 100 and associated with a particular user. The computing device 100 and user-carried device can exchange signals (for example Bluetooth™), the strength of which can be monitored by the computing device 100 (or the user-carried device) and then used as a parameter by the computing device 100 to determine a relative user location.

Figure 4:
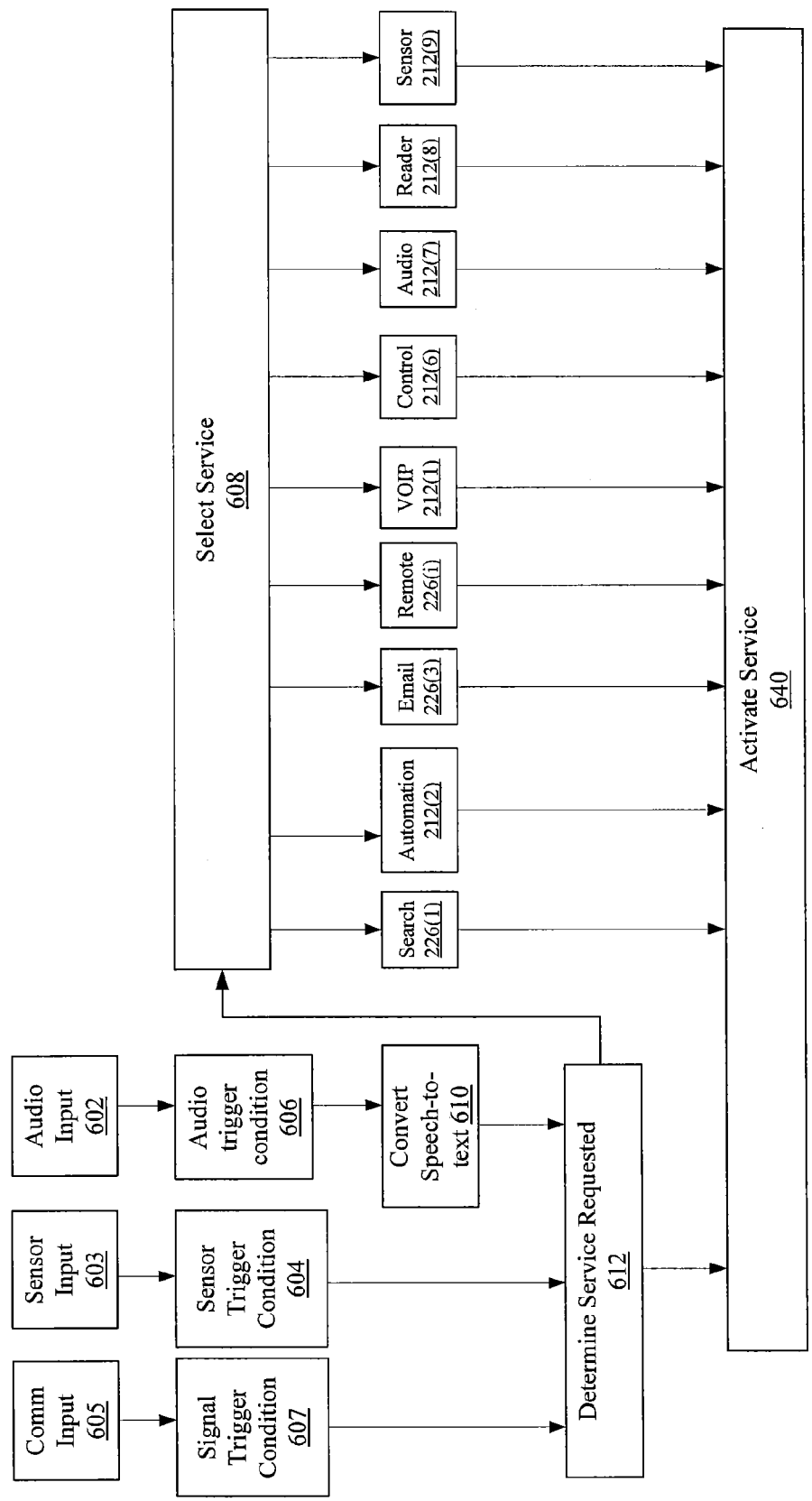
FIG. 4 is an example flow chart showing a method of using the computing device of FIG. 1 to perform a plurality of services.

In some embodiments, the user localization system 207 may include an infrared sensor to implement a motion detector for detecting proximity of a user. In some example embodiments, the user localization system 207 transmits measured parameters to a remote server such as server 223 and the calculations to estimate user proximity to the device 100 are performed at the server 223. An overview having been provided, examples of selected services that can be initiated and processed by the central processing unit 130 of the computing device 100 will now be described with reference to the flowchart of FIG. 4 and block diagram FIG. 2.

As noted above, in example embodiments the computing device 100 operates in a default monitoring mode in which it monitors for the occurrence of one or more input conditions that will prompt the device 100 to perform one or more actions. In an example embodiment the computing device 100 continuously monitors microphones 110 for audio inputs 602 within a listening proximity of the device 100 for audio triggers 606, monitors its environmental sensors 112, 114, 116 and 117 for inputs 603 that match sensor trigger conditions 604, and monitors communication signal inputs 605 for signal trigger conditions 607. When a trigger condition is detected, appropriate action is taken, as indicated by the following non-exhaustive list of examples.

Internet Search Service

In an example embodiment, the computing device 100 is enabled to facilitate verbally initiated internet searches. For example, a user, within proximity of the device 100 (typically a room in a house), speaks the trigger word or phrase (e.g. "Computer Listen") and then a request for information (e.g. "How tall is the Statue of Liberty?"). The microphone 110 on the device 100 detect the audio trigger condition 606 (the phrase "Computer Listen") and records the remainder of the utterance ("How tall is the Statue of Liberty?") as a user command audio record 232. As indicated at action 610 in FIG. 4, the user command audio record 232 is either sent through wireless communication system 134 to an Internet-based service 222 to be converted from speech to text or is converted on the device through local software. In the case of remote conversion, the text string (user command text record 234) is then sent through Internet Protocol (IP) communications link back to the device 100, or in the case of local software conversion, passed in-memory, for processing by natural language programming service selection program 206. Based on the content of the user command text record 234, the device 100 will automatically determine (action 612) what local service 212(i) or remote service 226(i) needs to be initiated and what information needs to be provided to the initiated service.

By way of example, in the context of the user command text record 234 "How tall is the Statue of Liberty", natural language programming service selection program 206, which is called on as part of action 612, is configured to recognize the text string as an information query, and based on that recognition determine that the appropriate service to initiate is a remotely hosted service 226(i) such as Internet search service 226(1) like "Ask.Com". In order to make this evaluation, the natural language programming service selection program 206 consults one or both of local logic and service lookup table 208 or remotely hosted probability based classifying algorithm 224. The natural language programming service selection program 206 generates service data 236 that identifies the correct service (in this example, an Internet search engine) and the information required for that service to provide an answer to the query. At 640, the device 100 will call on remote service access point 210 to provide a search query string to a selected remotely hosted Internet-based search engine 226(1). The remote service access point 210 then provides the results in the form of a text response record to acknowledgement service 214. In the present example, the text response record could include text selected from the "Your Answer" field of "Ask.Com", namely: "The Statue of Liberty is 305 feet tall (93 meters) from the ground to the tip of the flame. Source: nps.gov".

The acknowledgement service 214 then will either forward the text response record information to a Text-To-Speech (TTS) Internet-based service 230 or use local software 220 to convert to an audio file. The acknowledgement service 214 of device 100 will then call on an audio file player 218 to play back the locally stored or remotely hosted audio file for the user through the speakers 104. LED lights 124 may be actuated by the led light controller 216 as a means of complementing the relayed information.

Voice Operated Home Automation Service

Local services 212(i) could include one or more various home automation functions 212(2). For example, as audio input 602, a user could say the trigger phrase: "Computer Listen" followed by the voice command: "Set the room temperature to 72 degrees". Speech to text system 204 converts the verbal command into a user command text record 234 at action 610, which is then used by natural language programming service selection program 206 to select an appropriate service and the service data required to implement the command. In the present example, the natural language programming service selection program 206 recognizes that the appropriate service 212(i) is a thermostat control service 212(2) that is enabled to communicate at 640 with a centralized climate control device present at the house or structure in which the device 100 is located. The thermostat control service 212(2) provides the temperature setting and instructions to the centralized climate control device. Such communication could occur over a number of different communication paths—for example, the centralized climate control device could be on a common wireless LAN with the device 200, or could communicate through a Bluetooth or other peer-to-peer link with the device 200. Alternatively, the centralized climate control device could be controlled by a remotely hosted service 226 that is accessed by the natural language programming service selection program 206 through remote service access point 210. In some example embodiments, acknowledgement service 214 receives confirmation that the centralized climate control device has successfully received the command and provides feedback to the user through LED light controller 216 and/or audio file player 218.

Using the methods described above, the device 100 could be configured to allow centralized verbal control of any home device that can be electronically controlled, including for example lights, electronic door locks, automatic garage door openers, humidifiers, alarm systems, security and monitoring cameras, television and multimedia playback and recording equipment, and kitchen appliances (for example refrigerators, stoves, coffee makers).

Email Access Service

In one example, computing device 100 is configured to access electronic mail services 226(3) through voice and have the information read back to the user. This type of access can be used to aid those who have visual or mobility impairments to have access to their personal electronic mail. As audio input 602, a user would state the trigger word followed by a request to check their email, e.g. "Check my email". At 610, the device 100 after using an Internet-based STT service or local software would interpret this text string to determine at 612 to check through an IP network using the user's pre-defined credentials whether the user has an unread message. Once this information would be retrieved, the device 100 would state either through audio prompts or through the onboard LED lights whether the user has an unread electronic mail message. Additionally, through the device 100, emails can be dictated and sent to predetermined contacts either saved on the device or on an Internet-based service 226(3).

In another embodiment, the central processing system 130 of the computing device 100 is configured to check for emails associated with a user at regular intervals. When a new email is received, an email application specific trigger condition 608 is triggered. The central processing system 130 of the computing device 100 will initiate the electronic mail application 212(3) to check for new emails and to dictate any new emails out loud.

Local Information Request Service

A method of using the computing device 100 for retrieving local information based on sensor data collected by one or more of device sensors 112, 114, 116, 117, 119 and 108 will be described. The sensor information on device can be accessed through other devices using the communication system 134. The processor 130 of the computing device 100 is configured to run local information application 212(4) when triggered. An example of this would be for a user to ask, after saying the trigger phrase, "What is the temperature in the room?" The central processing system 130 of the computing device 100 will then run the local information application 212(4) and activate at 640 sensors on the device to measure the temperature in the room. Using similar methods as discussed above, the device 100 will indicate through spoken word or through LED lights 124 the answer to the information being requested.

VOIP Phone Service

With reference to FIG. 6, a method of using the computing device 100 for initiating or receiving phone calls will be described. Using similar methods as described above, the device will initiate phone calls through a Voice Over IP (VOIP) service 212(5) from a predefined list of contacts, a stated phone number, or a contact from a search result. The user will be able to initiate a call by uttering the trigger word followed by a command such as "Call John Smith". The device will determine the appropriate service 612 for initiating the call. The user can end a call using a voice command. If a call is received on the device, the device will present an audio and LED light based signal to the user and the user can accept or reject an incoming call through voice command, such as "Answer" or "Reject". The user will be able to end an accepted call through a predefined command such as "End Call" or automatically should the other party on the call disconnect.

In another embodiment, a VOIP call is received by device as a communications signal 605, resulting in triggering a VOIP application specific trigger condition at action 607. The central processing system 130 of the computing device 100 will run VOIP service 212(5). In some embodiments, the VOIP service will include determining the location of a user using user localization system 207. Based on the determined location of the user, the computing device 100 will determine if a notification of the call should be provided; for example, if no user is in close proximity to the computing device 100, then there is no need to provide a notification.

Local Application Control

With reference to FIG. 6, a method of using the computing device 100 to access and command virtual assistant services 212(6), such as alarm clock applications, software-based calendars, or reminder software. Based on voice commands received through audio inputs the computing device 100 will relay appropriate setting information to selected applications and alert the user of the settings through spoken word or LED light indicator.

Audio File Streaming Service

With reference to FIG. 6, a method of using the computing device 100 to stream audio files such a music or audio books using audio streaming application 212(7). The audio streaming service may be run after receiving a voice command 606 such as "Computer Listen. Play Springsteen" or based on an signal trigger 607 such as receiving notification a new podcast the user has subscribed to is available. The computing device 100 determines that the user wishes to stream audio, the computing device 100 will send a request to a music/audio streaming service 226 and will establish a connection to stream music that will be played on the device. The user will be able to initiate, pause, or stop music using voice commands.

In some example embodiments, the device 100 is also able to connect with other similar devices 100 to stream audio data in either one direction or two. The user through voice commands or through programming settings through a web portal may synchronize the streaming of audio data either from one device to another or simultaneously and bi-directionally between two devices 100. One application of this is to monitor the sounds in one room or for communicating between two rooms. The audio is picked up from the device in one room and sent through IP to the device in another room, even if that room is located in a different geography.

Feed Reader Service

With reference to FIG. 6, a method of using the computing device 100 to read aloud data from a predetermined source using the reader application 212(8). The user will initiate a voice command 606 that will direct the computing device 100 to pull information from an Internet-based service that hosts articles. In other embodiments, any new local breaking news automatically triggers a reader application condition 608. The device will read back the articles using a Text-to-Speech service 220 until the user issues a vocal command to stop or pause the reading or until the article ends. An example command would be "Read my feed" after which the device would proceed to speak back to the user the news feed.

Sensor Activation

In some example embodiments, the computing device 100 is triggered by a sensor input 603 detected by one or more of its sensors 108, 112, 114, 116, 117 or 119, resulting in a sensor trigger condition 604, in response to which the computing device 100 will automatically initiate a local service 112(i) or remotely hosted service 226(i)

For example, the computing device 100 can used as a trigger for home automation devices in response to sensed inputs. The computing device 100 is configured to continuously monitor measurements taken through one or more of its sensors 108, 112, 114, 116, 117 or 119 to determine if any of the sensor measurements fall outside of predetermined thresholds. The device 100 can send a command either through WiFi and IP or through RF to a home automation device or devices once a single or multiple thresholds of environmental parameters that are being measured by the device have been met.

Alternative Physical Embodiments

Figure 5:
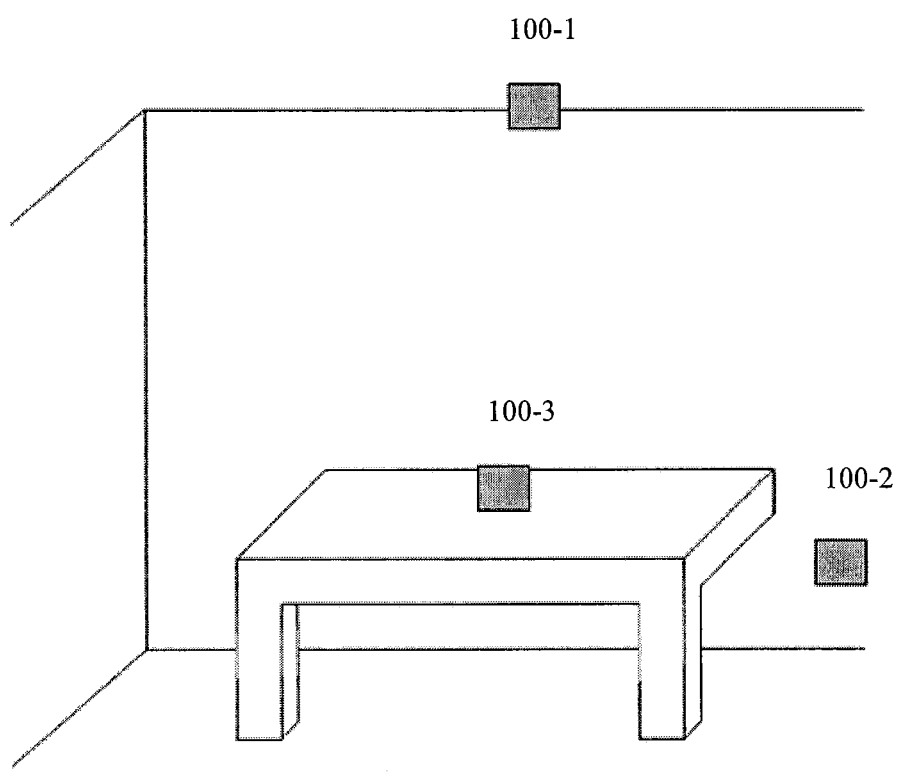
FIG. 5 is schematic image illustrating example placements of a computing device of FIG. 1 in various locations of a room.

In FIG. 1B the device 100 is shown as having two-prong electric plug 126 for plugging into a wall outlet that then supports the device 100. In different embodiments, power can be supplied to the device 100 using other methods. For example, a light-bulb style screw type interface could be provided on the device 100 instead of or in addition to plug 126 that would allow the device 100 to be screwed into and supported and powered by a conventional light socket. In some examples, the device 100 could have a power cord extending from it for plugging into an AC outlet or a DC outlet. Different configurations of the device 100 allow it to be located in different locations in a room—for example as illustrated in FIG. 5, a device 100-1 equipped with a light socket interface could be located at a light socket location at the ceiling of a room; a device 100-2 with a rigidly attached plug 126 could be mounted to an electrical wall outlet of a room; and a device 100-3 that was battery powered and/or include a power cord with and AC/DC adaptor could be located on a table or counter or other horizontal support surface.

Distributed Computing System

In example embodiments, the voice-enabled computing device 100 requires that a user be within an aural sensitivity range of the device. Therefore, in a multi-room building or a large room one computing device 100 may not have a sensitivity region large enough to receive sound inputs from all regions of the building or room. Accordingly, in order to address this issue, in some example embodiments, multiple devices 100 can be configured to cooperate with each other at a house or building unit. The devices 100 may be configured to communicate with each other in any number of ways, including for example through Bluetooth, or a common Wi-Fi network, or an IP over power line connection, or through a remote host such as server 223, or a combination of the forgoing. In such a configuration, multiple devices 100-A, 100-B can be located throughout a house or structure as shown in FIGS. 6A-6C to form a distributed computing system. In example embodiments, as the user moves from one room to another, a user session with a device 100-A located in one room 410 will be automatically transferred to a second device 100-B located in another room 420. While engaged in a session with the first device 100-A, as the user falls within range of audio of the second device 100-B, the second device 100-B (or another computer such as server 223) will assess whether the user is moving towards it based on inputs from stereo microphones 110. The second device 100-B (or server 223) will communicate (for example through Internet Protocol (IP)) with the first device 100-A to transfer the session to the second device 100-B. The user will then be able to continue the session on the second device 100-B.

In some embodiments, the devices 100 forming a distributed system are configured to communicate directly with each other. In such systems, one of the devices 100 may be configured to take on a supervisory role. In some example embodiments, communications between the devices 100 may be indirect, for example through a network connection to a remote host or server 223. When communicating through a remote host or server 223, the messages transmitted between the multiple devices may be relayed via the remote host or the server 223. The remote host or the server 223 may also provide additional functionality, such as providing a remotely hosted speech-to-text system 222 and/or a remotely hosted lookup table 224 and/or a remotely hosted text-to-speech system 230, or other remotely hosted service 226, provide a determination of session quality for the multiple computing devices, or controlling session transfers.

In order to facilitate transfer of voice sessions between devices, in an example embodiment the user localization system 207 of each device 100-A, 100-B in a distributed system is configured to periodically determine a session quality value or score for the respective device 100-A, 100-B. The session quality value for a particular device 100 can be based on one or more measured parameters, including for example an (1) estimated physical proximity of the user to the device (which as noted above, can be determined based on magnitude and direction of sound inputs at microphone array 110, or based on signals received from a signal producing device fixed to the user; or based on an infrared motion detection system of the device 100); and (2) quality of the network connection of the device 100 to other devices in the distributed system or to one or more remote hosts or servers 223 that the device 100 communicates with. To determine the quality of the network connection, the processing system 130 of the computing device 100 may measure and/or characterize one or more parameters, including for example a connection speed, such as number of megabits per second (Mbps) transmitted, a jitter-rate, a ping time, or other parameter. The session quality value for a particular device 100 can also be based on the relevance of an uttered user command to a previously uttered user command, when both user commands have the same context. The context can be determined using the natural language programming service selection 206. If, for example, the uttered user command utilizes the same local service 212($n$) or remotely hosted service 226($i$) as the previously uttered user command, then the relevance is determined to be high, and thus the session quality is also determined to be high.

Another example parameter is the location of the computing device 100 relative to other computing devices 100 in the distributed system network, determined for example based on communications parameters of signals between the devices, or as set during a device configuration stage. Estimated physical proximity of the user to the device may for example be determined based on parameters that supplement or replace voice strength and direction such as the signal-to-noise ratio (SNR) of the user's voice as received by the microphone 110, which helps to characterize any ambient noise in the room 410. During an active voice session, a proximity parameter contributing to the session quality value could be based on an estimated error rate based on the number of user commands interpreted incorrectly, for example, the number of times the user has to issue a command to correct the action of the device 100. Another example parameter is based on historical data characterizing the relevance of the computing device 100 in processing a particular request; for example, if the request is to read a page aloud and the user has historically moved to a chair in the room 420 to listen to the reading of the page. One or more of the above mentioned parameters may then be used to calculate a session quality value associated with the user's voice, for example, by providing a value to each of a particular range of each of the parameters and using a weighted average of all the parameters.

In at least some example embodiments, the session quality value for a device 100 will be set to nominally low value until the user localization system 207 detects a user within a predetermined proximity of the device. In at least some example embodiments, each device 100 is periodically sends locally measured parameters to remote server 223 and remote server 223 performs at least some of the functions of user localization system 207 and calculates a session quality value for each device 100.

An example of a session transfer between devices 100-A and 100-B will now be described with reference to FIGS. 6A-6C and the flow diagram 500 of FIG. 7 in the context of an environment in which the devices 100-A and 100-B each communicate over the Internet with a remote server 223 that is configured to oversee and manage interactions between multiple devices 100-A, 100-B. In an example embodiment, the multiple devices 100-A, 100-B are each pre-registered with the server 223, and the server 223 maintains or has access to a database of voice authentication records for users that are authorized to use the devices 100-A, 100-B.

Referring to FIGS. 6A-6C, an example will first be described where a user in an active session with device 100-A at position 400 moves to position 402 and then to position 404. In FIG. 6A, the user is at position 400 in room 410 and is engaged in an established session 502 with the first device 100-A. At such location, the user's voice input 504 is only within the sensitivity range of the microphone 110 of the first device 100-A and the session quality value determined for the first device 100-A is above predetermined thresholds. The user is outside the proximity range of the second device 100-B and is thus not detected by the user localization system 207 of second device 100-B.

In the illustrated embodiment, the first device 100-A is being used by the user 501 for a VoIP call during the session 502. The first device 100-A periodically transmits one or more parameters to the server 223 to allow the server to calculate a session quality value or score for the established session 506. As shown in FIG. 7, the server 223 maintains a session record 520 that tracks information about the session 502, including but not limited to a session ID; a session quality score; the services being used; a user ID of user 501; and a device ID for first device 100-A. Variables that contribute to the session quality score could for example include a sound level, direction, signal to-noise ratio and a predicted distance of the user 501 from the device 100-A (some or all of which could be calculated at device 100-A and sent to the server 223 as part of the quality parameters 506, or alternatively the device 100-A may send raw measured data to the server 223 as quality parameters 506 for the server 223 to perform some or all of the relevant calculations). Other variables that may be factored into the session quality score include speech-to-text (STT) performance parameters such as an accuracy indicator of any STT done at the first device 100-A or the server 223. Additionally, in some examples network variables such as latency in communications between the server 223 and the first device 100-A may be derived from parameters 506 and other signals exchanged between the first device 100-A and the server 223 and factored into session quality score.

In at least some example embodiments, the server 223 maintains a list of devices 100 that are known to be associated with the user 501 and/or part of a common distributed system with the device 100-A and regularly compares predicted session quality scores based on parameters received from those devices 100 against the score for device 100-A while the session 502 is ongoing.

Figure 7:
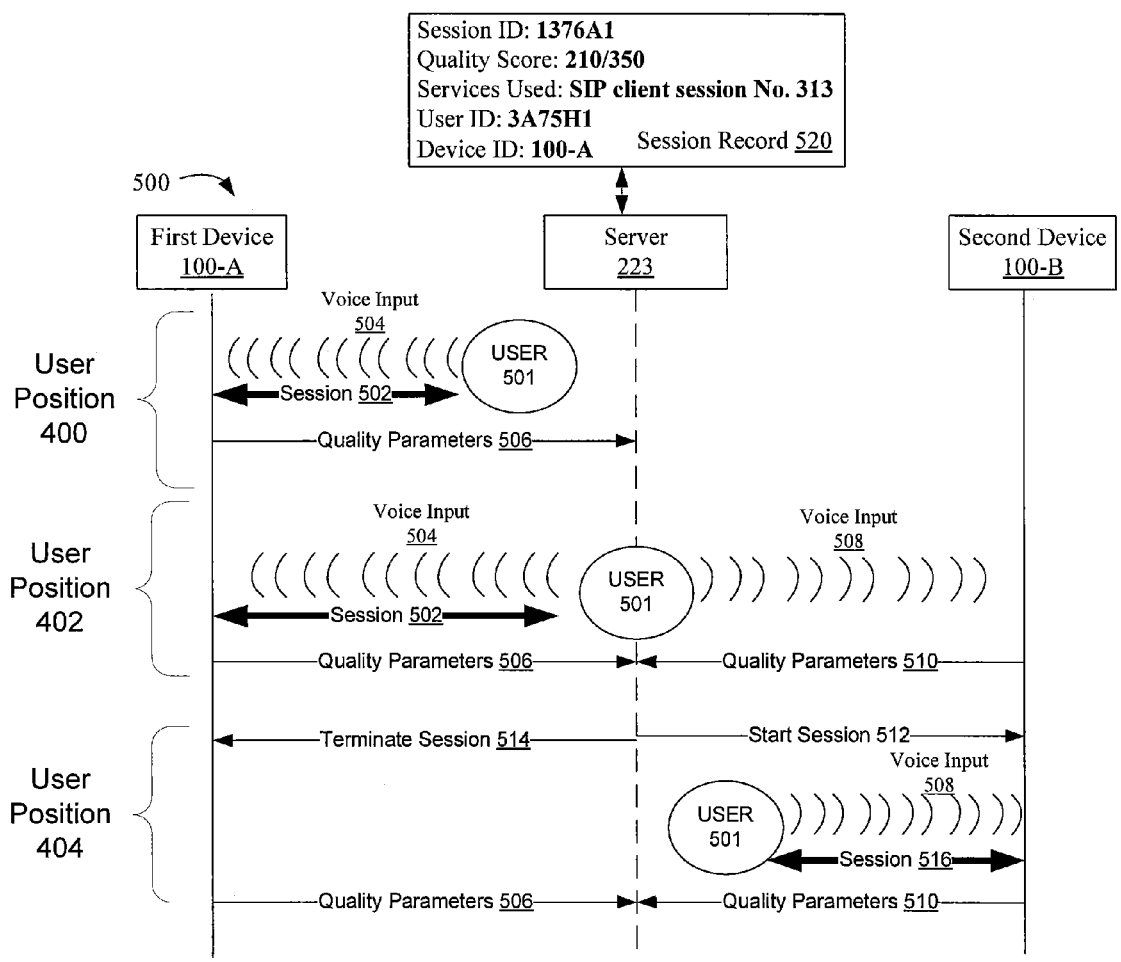
FIG. 7 is a flow diagram showing a method of using a server computer to control a session transfer between two devices of FIG. 1.

As illustrated in FIG. 7, as the user moves to position 402, the user's voice continues to be a voice input 504 within the sensitivity range of the microphone 110 of the first device 100-A and also starts to become a voice input 508 to the microphone 110 of the second device 100-B. Accordingly, the user's presence can be detected by the user localization system 207 of both devices 100-A and 100-B, and the first device 100-A and 100-B each receive respective voice inputs 504, 508 from the user, with an active voice session 502 being maintained with the first device 100-A. In an example embodiment, when an unengaged device 100-B starts to receive voice input 508 the device 100-B will, in addition to monitoring for a trigger phrase, also implement steps to try and recognize the user 501 and also provide quality parameters 510 to the server 223 so that the server 223 can track a predicted session quality score for a future session between user 501 and the second device 100-B. In an example embodiment, the device 100B—sends samples of voice input 508 to server 223 so that the server can apply voice print recognition algorithms to identify and authenticate user 501. User 501 may also for example be identified by input signals received by device 100-B from a user associated RFID or other communications device. Accordingly, once a device 100-B starts to receive voice input 508, the server 223 begins pre-session tracking in which it attempts to identify the user 501 and track a predicted session quality score between the user 501 and the device 100-B. When the server 223 identifies the user 501, the server 223 will check ongoing session records 501 to determine if the user 501 is currently engaged in a session with another device 100-A associated with the user 501, and will track the quality score of ongoing user session 502 relative to the predicted quality score for a session between user and the second device 100-B. The server 223 is configured to looks at what services are being used by the first device 100-A as identified in current session record 520 and determine, in dependence on the relative quality scores, if some or all of the services should be transferred to a session implemented on the second device 100-B.

When transferring a session between devices 100-A, 100-B, the server 223 will provide all information necessary for the second computing device 100-B to continue the session. This information may include one or more of a user ID associated with the user as determined by the voice authentication system 203; a log file containing a history of commands received from the user during the voice session; and a log file containing a history of results provided to the user by the first computing device 100-A.

In some example embodiments, one of the devices 100 in the distributed system could be purposed to act as a session management device and perform some or all of the session management functionality described above in respect of server 223. In some examples, server 223 may be a computer located on the same premises as a distributed computing system made up of devices 100.

In an example embodiment, when no session is currently active and a user within range of multiple devices 100-A, 100-B utters the trigger phrase the server 223 will receive quality parameter information from both devices and select the device with the highest predicted quality score.

In at least some example embodiments, devices 100 that are part of a distributed system are pre-configured so that at least one of the devices 100 (for example a supervisory device 100) in the system tracks at any given time the number and identity of the devices 100 active in the distributed system. In some example embodiments the server 223 tracks at any given time the number and identity of the devices 100 active in the distributed system. In this regard, any number of micro-networking protocols could be applied for authenticating and registering devices 100 that are currently active in the distributed system.

It will this be appreciated that in one aspect the present disclosure provides a method for session passing for interaction with multiple computing devices 100. In the absence of an automated transfer system, a user moving from one device to another would need to terminate a session on one device and then establish a new session on another, resulting in a pause between sessions that may lead to the loss of data or may be distracting to the user. Thus, in at least some embodiments the present disclosure describes a method that allows for the transfer of sessions between multiple devices 100 without the active or manual involvement of the user.

Referring again to FIG. 7, in an example embodiment, a user 501 engages in an interactive session 502 with one computing device 100-A. As the user 501 moves within a given range of a second computing device 100-B, the second computing device 100-B sends identification parameters and session quality assessment parameters 510 to a central computer such as a web-hosted server 223. The server 223 determines who the user is, whether the user is engaged in an interactive session 502 and whether interaction quality on the second device 100-B is better than on the first device 100-A. If a threshold is passed, the user's session 516 is initiated on second device 100-B and terminated on first device 100-A.

In at least some example embodiments, sessions between a user 501 and a computing device 100 include bilateral communication between human and computer. Identification parameters used to identify users at device 100 or server 223 can include, among other things, data that is captured from the device 100 that can be compared against a record of possible users for the purpose of identifying the user (e.g. biometrics such as voice print or RFID). Session quality score can be based on multiple parameters such as audio signal quality, proximity of user to device, physical position of user, and connection latency with central computer/server 223, among other things.

The use of a distributed system comprising multiple device 100 may in some home or other environments provide different functionalities for than a conventional handheld or wearable device in terms of autonomy, always being on, a plurality of possible users, and use from a distance. In at least some of the embodiments described herein, computing device 100 includes: a microphone array 110 for capturing quality sound and voice; speakers 104 to provide voice output or play sound/music; sensors for home monitoring; a power module to plug into the wall to support an "always on" configuration; communication support for Bluetooth™ and other protocols such as Zigbee™ to connect to other devices and and WiFi for connection to a router and the Internet.

In at least some example embodiments the device 100 uses the Android operating system which potentially enables it to connect to many free and subscription service APIs (such as google STT, US services, home automation APIs). In some embodiments, voice activated and hands free applications onboard include one or more of: voice searching internet (weather, people, scientific, task (reminder, email, SMS)); VOIP services and phone calls; Music playing; Server API for other developers to build apps. In some examples, the device 100 supports user configurable voice commands, for example, controlling lights by saying "Computer, turn off the lights", or voice control of temperature via a programmable thermostat that communicates with the device 100.

In some example embodiments, a user's mobile device such as smart phone can be configured to function as a device 100 within a distributed system such as described above. By way of example, a user may into their home talking on their suitably configured smart phone using a voice session. The user then leaves the phone somewhere and as they walk near another computing device 100-A, which continues the voice session while the original smart phone session is terminated.

In another example of a session transfer, a user composing an email on one device 100-A through verbal input moves towards the second device 100-B. In example embodiments, the user can continue to compose and send the email on the second device 100-B. In some embodiments, a user can configure a username, passwords, and services through a web portal, implemented for example by server 223. Biometric or other identifying information can also be configured using the web portal. In another example embodiment a user initiates a purchasing session with a session compatible device 100. The session is then transferred from one device 100 to another as the user session quality changes from one device to the other. In another example embodiment, an application on the first device 100-A is analyzing the mood of the user 501. This application may analyze the tone and content of the user's speech to determine the user's mood. As the user moves closer to a second device 100-B, the second device take over the session and begin streaming the information to the user. The session on the first device is closed.

In another example embodiment, multiple devices can be use to implement parallel sessions for mixed sequential user inputs as follows: The user participates in a plurality of parallel sessions, exp. home automation session and purchasing session. The utterance of the user may contain a random sequence of inputs where each input is intended for a different session. The system server 223 then decides the likelihood of user intention based on history of user commands and pre-recorded commands in the database, so that each session receives the intended voice input.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the described embodiments set forth in the examples, but should be given the broadest interpretation consistent with the description as a whole.

The invention claimed is:

1. A sound operated method, the method comprising:
receiving, by a first computing device, a sound, wherein the sound is associated with a user, and in response to receiving the sound, establishing, by the first computing device, a voice session associated with the user;
determining, by the first computing device, a session quality associated with the sound;
sending, by the first computing device, the session quality to a further computing device;
receiving, by the first computing device, a request to transfer the voice session to a second computing device; and
in response to receiving the request, transferring, by the first computing device, the voice session to the second computing device.

2. The method of claim 1, wherein transferring the voice session comprises:
detecting, using a speech to text recognition engine, a command associated with the sound; and
sending the command to the further computing device.

3. The method of claim 2, wherein transferring the voice session further comprises:
detecting a user identification associated with the sound; and
sending the user identification to the further computing device.

4. The method of claim 1, wherein the further computing device is one of the second computing device and a server.

5. The method of claim 1, wherein determining the session quality associated with the sound further comprises determining a distance between the first computing device and the sound.

6. The method of claim 1, wherein the session quality is determined based on any of a connection quality between the first computing device and a server, and a signal-to-noise ratio of the sound.

7. The method of claim 1, wherein the further computing device is a server having an established connection with the first computing device and the second computing device, the method further comprising the following actions implemented at the server:
receiving, from the first computing device, the session quality;
receiving, from the second computing device, a second voice session quality indicator associated with a second sound received at the second computing device;
comparing the session quality with the second voice session quality indicator to identify the computing device having a higher voice session quality; and
sending the request to the first and second computing devices to transfer the voice session to the computing device having the higher voice session quality.

8. A first computing device comprising a
a microphone;
an audio output;
a communications system for RF communications; and
a central processing system operatively connected to the microphone, the audio output and the communications system;
the central processing system being configured to:
receive a sound at the microphone of the first computing device, wherein the sound is associated with a user, and in response to receiving the sound, establish a voice session associated with the user;

determine a session quality associated with the sound;

send the session quality to a further computing device;

receive a request to transfer the voice session to a second computing device; and in response to receiving the request, transfer the voice session to the second computing device.

9. The first computing device of claim 8, wherein to transfer the voice session the central processing system is further configured to:

detect, using a speech to text recognition engine, a command associated with the sound; and send the command to the further computing device.

10. The first computing device of claim 9, wherein to transfer the voice session the central processing system is further configured to:

detect a user identification associated with the sound; and send the user identification to the further computing device.

11. The first computing device of claim 8, wherein the further computing device is one of the second computing device and a server.

12. The first computing device of claim 8, wherein determining the session quality associated with the sound further comprises determining a distance between the first computing device and the sound.

13. The first computing device of claim 8, wherein the /ion quality is determined based any of a connection quality between the first computing device and a server, and a signal-to-noise ratio of the sound.

* * * * *